United States Patent [19]

Bonny

[11] 3,837,083

[45] Sept. 24, 1974

[54] CHRONOCOMPARATOR DIAGRAM READER

[75] Inventor: Jean-Pierre Bonny, La Chaux de Fonds, Switzerland

[73] Assignee: Portescap, La Chaux de Fonds, Switzerland

[22] Filed: June 14, 1972

[21] Appl. No.: 262,610

[30] Foreign Application Priority Data

June 16, 1971 Switzerland ........................ 8767/71

[52] U.S. Cl. ..................... 33/1 C, 33/1 B, 33/1 SD, 73/6

[51] Int. Cl. ........................ G06g 9/00, G06g 11/00

[58] Field of Search .............. 33/1 R, 1 B, 1 C, 1 D, 33/1 G, 1 N, 1 BB, 1 SB, 1 SA, 1 SD; 73/6; 346/71, 72, 33 A

[56] References Cited

UNITED STATES PATENTS

| | | | |
|---|---|---|---|
| 1,107,740 | 8/1914 | Bailey | 33/1 C |
| 1,967,072 | 7/1934 | Young | 73/6 X |
| 2,254,649 | 9/1941 | Gibbs | 73/6 |
| 3,255,529 | 6/1966 | Jeanmairet | 33/1 C |

*Primary Examiner*—John Petrakes
*Assistant Examiner*—Milton S. Gerstew
*Attorney, Agent, or Firm*—Curtis, Morris & Safford

[57] ABSTRACT

A device for reading chromocomparator diagrams recorded on a base web in a plurality of parallel strips has first and second pivotally interconnected arms, with the first arm pivotally mounted for rotation about a fixed pivot point, and a reticulated transparent reading disk rotatably mounted on the second arm. A transmission system of cables and pulleys operatively interconnect a control knob with the reticulated disk to permit angular adjustment of the disk with respect to a diagram positioned adjacent the disk, independently of the position of the first and second mounting arms.

7 Claims, 1 Drawing Figure

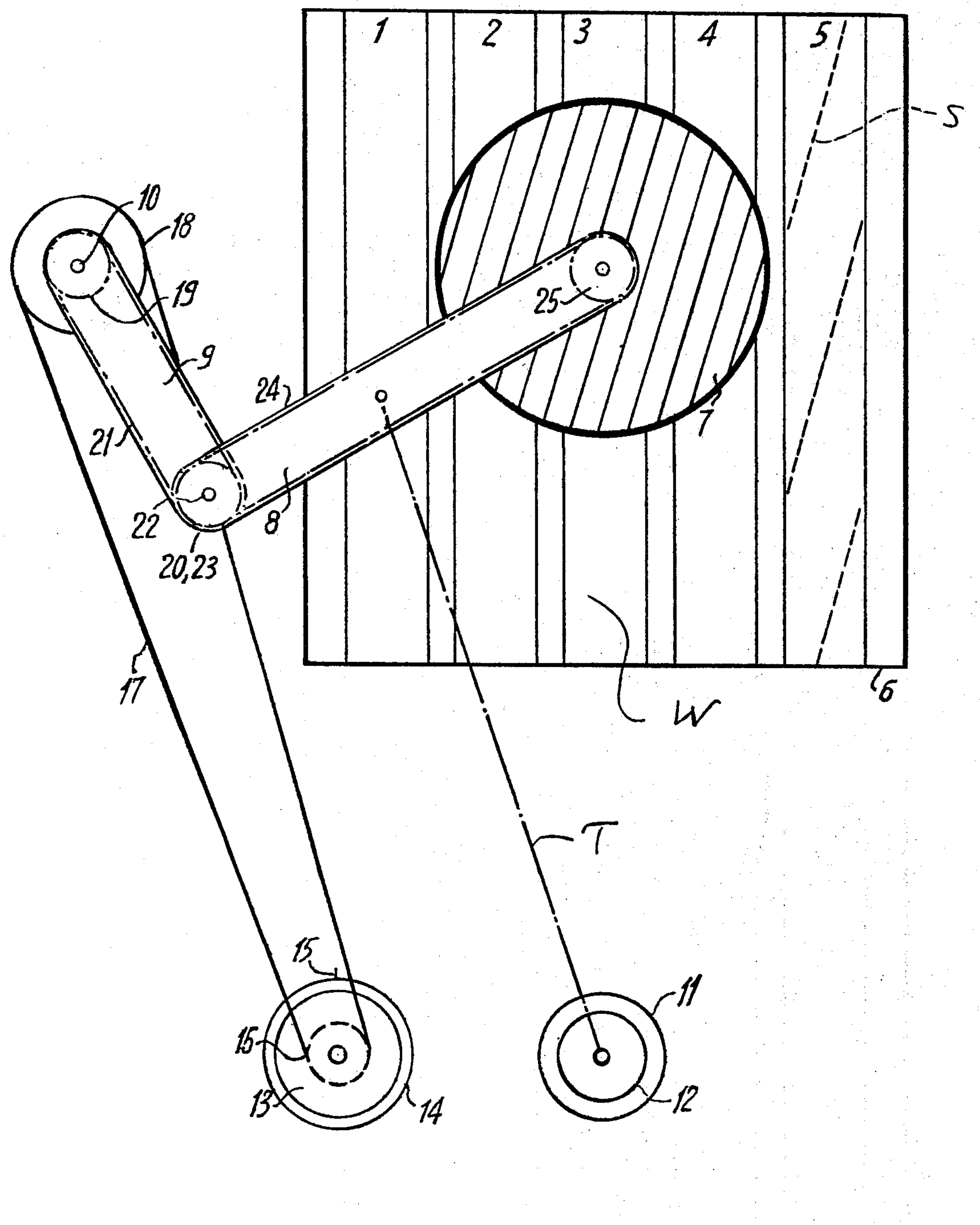
1
2
3
4
5
S
10
18
19
9
24
25
21
22
8
7
20,23
17
W
6
T
15
16
13
14
11
12

CHRONOCOMPARATOR DIAGRAM READER

The present invention relates to a reader for chronocomparator diagrams recorded on a plurality of parallel strips and more particularly to a chronocomparator diagram reader including a transparent, reticulated reading disk connected to a control knob through a transmission system which permits adjustment of the angular position of the disk upon the reading of a diagram placed below the disk.

Chronocomparators are known devices that are generally utilized in measuring the rate of watches and clocks. Such devices form diagrams on a base or reading web, which diagrams are, in general, in the form of a succession of points forming a straight line that is inclined with respect to the direction of advance of the recording web. This inclination represents a measure of the rate of the watch or clock being tested.

In order to read these diagrams, a transparent, reticulated disk is generally placed above the recording web with the angular position of the disk being adjusted to cause the lines thereon to coincide with the slope of the recorded line. Typically, a reading dial is operatively associated with a control knob for rotating the reading disk so that the angular position of the disk is directly readable from the position of the control knob.

In order to measure or test several watches or clocks at the same time, multiple chronocomparators have previously been proposed which record the different rate diagrams of each watch on parallel strips. Reading devices for use with such chronocomparators generally include reticulated reading disks whose diameter is at least equal to the total width of all the recorded strips and which is mounted for rotation at a fixed position located in the middle of the rectangular reading surface; with the dimensions of the reading surface corresponding to the width of all the recorded strips and to the length of strip available for the reading.

However, such previously proposed chronocomparator readers have the serious drawback of not permitting the reading of the parts of the diagrams or recorded strips located in the corners of the reading surface; or, alternatively, of requiring a disk which is larger than the reading surface of the device, so that it takes up a very large amount of space.

Accordingly, it is an object of the present invention to overcome the disadvantages of the previously proposed chronocomparator readers.

Another object of the present invention is to provide a chronocomparator reader which is compact in size and which provides accurate readings.

Yet another object of the invention is to provide a device of the character described which is relatively inexpensive to produce and simple to manufacture.

In accordance with one aspect of the present invention, a transparent reticulated reading disk is rotatably mounted at the end of a disk-holder arm pivotally connected to the end of a second arm. The latter is pivotally mounted at a fixed pivot point in a predetermined position with respect to the support of the recorded strips. The reading disk is rotated, to adjust its angular position with respect to the line on the recorded diagram, from a control knob, through a transmission system including an assembly of pulleys and transmission cables, which are arranged to permit adjustment of the reading disk independently of its associated arms.

The above, and other objects, features and advantages of this invention will be apparent in the following detailed description of an illustrative embodiment thereof which is to be read in connection with the accompanying drawings; wherein the single figure is a diagrammatic illustration of a chronocomparator diagram reader constructed in accordance with one embodiment of the invention.

Referring now to the drawing, it is seen that the chronocomparator diagram reading device C, constructed in accordance with the present invention, includes a rectangular reading window 6 formed in its frame (not shown) through which the chronocomparator diagram web is passed. In the illustrative example, the web W has five chronocomparator recording strips 1 to 5 formed thereon including a plurality of inclined lines S thereon.

In one presently preferred embodiment of the invention, a transparent, reticulated reading disk 7 is rotatably mounted on the end of a disk-holder arm 8. That arm is pivotally connected to a second arm 9, in any convenient manner, and arm 9 is, in turn, pivotally mounted in the frame of device C on a pivot pin 10 which is located in a predetermined position with respect to the recording strip W passing through window 6. Of course, pin 10 is located outside of window 6.

The position of the two arms, 8, 9 and thus the position of reading disk 7 within window 6, and with respect to strip W is adjusted in any convenient manner, such as by a transmission T (schematically illustrated by phantom lines), under the control of horizontal and vertical displacement knobs 11, 12, mounted below the reading window 6 on the front wall of the chronocomparator.

A control knob 13 is rotatably mounted on the front wall of reader C and is operative to control rotation of disk 7. Knob 13 includes a reading dial 14 provided with graduations thereon which makes it possible to read or determine, opposite a fixed point 15, the angular position of disk 7.

Control knob 13 is rigidly connected with a coaxial pulley 16 which is connected by a transmission cable 17 to a pulley 18. The latter is freely pivotally mounted on pin 10 for rotation independently of arm 9 and has a diameter which is a multiple of that of pulley 16. Transmission cable 17 is wound twice around pulley 18 and two or more times around pulley 16 to permit the pulleys to effect at least one complete revolution in either direction. Moreover, cable 17 is attached to each of the pulleys 16, 18 at a point on their peripheries to avoid any slippage between the pulleys and the cables during rotation thereof; thereby avoiding any shift between their corresponding angular positions.

Pulley 18 is rigidly connected with a coaxial pulley 19 that transmits its movement or rotation to a pulley 20 by means of a transmission cable 21 passing around said pulleys and attached to their peripheral portion in a maner similar to cable 17. Pulley 20 is freely rotatably mounted on the pivot pin 22 of the arms 8 and 9 for rotation independently of those arms and in its turn is rigidly connected with a coaxial pulley 23 of the same diameter. Pulley 23 transmits the rotary movement in the same way, via a cable 24, to a pulley 25, mounted on the end of the arm 8, coaxially with the disk 7 and rigidly connected with it.

Rotation of control knob 13 is thus transmitted in a strictly constant angular relationship to reading disk 7, whatever the position of the arms 8 and 9. The angular position of knob 13 and of disk 7 also remain unchanged when disk 7 is displaced on the reading surface by movement of arms 8 and 9.

In the illustrative embodiment, pulleys 19, 20, 23 and 25 have the same diameter and thus the reduction ratio between the rotation of the control knob and the rotation of the reading disk is the ratio between the diameter of the pulleys 16 and 18.

The diameter of disk 7 is selected to be equal to a fraction of the total width of the recorded strips so that this disk can be placed in the corners of the surface 6 and permit a reading of the corresponding portions of the diagram without exceeding the surface 6. Thus, the apparatus is more efficient and more compact than previously proposed chronocomparator diagram readers.

In one embodiment of the invention, control knob 13 is operatively associated with a remote-control device (not shown) of an apparatus which indicates or records the angular position of the disk. In this embodiment, rotary knob 13 is constructed in any convenient manner to be axially displaceable so as to actuate the remote-control device and transmit an electric signal containing the information concerning the angular position determined. The construction of this auxiliary equipment and its connection to the reader of the invention would be apparent to those skilled in the art and thus need not be described in detail.

The reading of diagrams W by the device of the present invention is effected in the following manner: the operator places reading disk 7 in the desired position on the recording strip W to be explored by means of the control knobs 11 and 12 acting on the arms 8 and 9 through transmission T. In this position, the operator turns control knob 13 so as to make the reticulations of disk 7 coincide with a line or part of a line recorded on the strip. For this purpose he can also readjust the position of the disk on the reading surface by means of the displacement of knob 13 to read successive lines S. On the dial he then reads the slope of the diagram and/or pushes on the control knob 13 to actuate a telerecorder.

Although illustrative embodiments of the present invention have been described herein with reference to the accompanying drawing, it is to be understood that the invention is not limited to those precise embodiments and that various changes and modifications may be effected therein by one skilled in the art without departing from the scope or spirit of this invention.

What is claimed is:

1. A device for reading chronocomparator diagrams recorded on a base web in a plurality of parallel strips comprising first and second pivotally interconnected arms, said first arm being mounted for rotation about a fixed pivot point, a reticulated transparent reading disk rotatably mounted on said second arm along an axis parallel to said fixed pivot point and perpendicular to the base web to be read, and means for adjusting the angular position of said reading disk with respect to a chronocomparator diagram positioned adjacent and parallel to said disk independently of the position of said first and second arms.

2. A device for reading chronocomparator diagrams recorded on a base web in a plurality of parallel strips comprising first and second pivotally interconnected arms, said first arm being mounted for rotation about a fixed pivot point, a reticulated transparent reading disk rotatably mounted on said second arm, and means for adjusting the angular position of said reading disk with respect to a chronocomparator diagram positioned adjacent said disk independently of the position of said first and second arms, said adjusting means including a rotatable control knob and a plurality of pulleys and cables operatively connected between said control knob and said disk whereby the angular position of said control knob corresponds to the angular position of said disk.

3. The device as defined in claim 2 wherein said first and second arms are pivotally interconnected at a pivot point and said pulleys and cables include a first pulley rigidly connected to said control knob for rotation therewith, a second pulley rotatably mounted at said fixed pivot point for rotation independently of said first arm, a first transmission cable operatively connected between said first and second pulleys for transmitting rotation of said control knob to said second pulley, a third pulley rigidly connected to said second pulley for rotation therewith, fourth and fifth rigidly connected pulleys freely rotatably mounted at the pivot point between said first and second arms, a second transmission cable operatively connecting said third and fourth pulleys, a sixth pulley rigidly and coaxially connected to said disk for rotation therewith, and a third transmission cable operatively interconnecting said fifth and sixth pulleys.

4. The device as defined in claim 3 wherein the diameter of said second pulley is a multiple of the diameter of said first pulley and said third, fourth, fifth and sixth pulleys have the same diameters.

5. The device as defined in claim 4 wherein said cables are rigidly secured to their associated pulleys and control knob to eliminate slippage therebetween.

6. The device as defined in claim 2 including means, operatively associated with said control knob for recording the angular position of said disk.

7. The device as defined in claim 2 including means for varying the positions of said first and second arms with respect to said diagram, independently of said disk.

* * * * *